(12) United States Patent
Katayama (10) Patent No.: US 12,370,864 B2
(45) Date of Patent: Jul. 29, 2025

(54) IN-VEHICLE VENTILATION SYSTEM

(71) Applicant: YAZAKI CORPORATION, Tokyo (JP)

(72) Inventor: Kazutaka Katayama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 201 days.

(21) Appl. No.: 17/870,949

(22) Filed: Jul. 22, 2022

(65) Prior Publication Data

US 2023/0055043 A1     Feb. 23, 2023

(30) Foreign Application Priority Data

Aug. 19, 2021 (JP) .................. 2021-134242

(51) Int. Cl.
    *B60H 1/00*      (2006.01)
    *B60H 1/24*      (2006.01)

(52) U.S. Cl.
    CPC ............... *B60H 1/008* (2013.01); *B60H 1/24* (2013.01)

(58) Field of Classification Search
    CPC .................................. B60H 1/008; B60H 1/24
    See application file for complete search history.

(56) References Cited

U.S. PATENT DOCUMENTS

| | | | |
|---|---|---|---|
| 9,688,194 B2 | 6/2017 | MacNeille et al. | |
| 11,007,846 B2 | 5/2021 | Badger, II et al. | |
| 2006/0030253 A1 | 2/2006 | Asai et al. | |
| 2020/0070627 A1* | 3/2020 | Sakai | B60N 2/0024 |
| 2020/0384959 A1* | 12/2020 | Zhou | B08B 5/04 |
| 2021/0374412 A1* | 12/2021 | Cerri | G06T 7/90 |
| 2024/0010044 A1* | 1/2024 | Borrel | B60H 1/00849 |
| 2024/0075949 A1* | 3/2024 | Kim | G06V 20/56 |

FOREIGN PATENT DOCUMENTS

| | | |
|---|---|---|
| EP | 1686439 A1 | 8/2006 |
| JP | 2006-1310 A | 1/2006 |
| JP | 2006-298169 A | 11/2006 |
| JP | 2018-131053 A | 8/2018 |
| JP | 2019-217944 A | 12/2019 |
| JP | 2021-91257 A | 6/2021 |

\* cited by examiner

*Primary Examiner* — Lail A Kleinman
(74) *Attorney, Agent, or Firm* — Sughrue Mion, PLLC (57) ABSTRACT

An in-vehicle ventilation system includes a host ECU configured to acquire vehicle outside information using wireless communication, an air conditioner ECU configured to control an air conditioner installed in a vehicle compartment, a zone ECU configured to control a device in the vehicle compartment and to communicate with the host ECU and the air conditioner ECU and a power window unit configured to open and close a window of a vehicle. The zone ECU or the host ECU is configured to perform, based on information acquired inside the vehicle compartment and the vehicle outside information to be acquired by the host ECU, interlocked ventilation control interlockingly controls the power window unit and the air conditioner ECU.

3 Claims, 6 Drawing Sheets

SWITCHING AMONG THREE VENTILATION MODES

| | Ventilation Mode (C00) | Situation (C10) | Power Window Control | Switching Valve in Duct for Introducing (C20) | Ventilation Status (Cs) |
|---|---|---|---|---|---|
| M1 | VENTILATION (STRONG) | A : B | ON | OUTSIDE AIR INTRODUCTION | HIGH |
| M2 | VENTILATION (WEAK) | OTHERS | OFF | OUTSIDE AIR INTRODUCTION | MID or LO |
| M3 | VENTILATION OFF | C | OFF | INSIDE AIR CIRCULATION | OFF |

(T01 points to the "Switching Valve in Duct for Introducing" column header)

| | |
|---|---|
| A: | WHEN DIFFERENCE BETWEEN OUTSIDE AIR TEMPERATURE AND ROOM TEMPERATURE IS CALCULATED, AND ROOM TEMPERATURE IS HIGHER THAN OUTSIDE AIR TEMPERATURE BY CERTAIN VALUE OR MORE (IMMEDIATELY AFTER IG ON, ONLY ONCE) (THEN ENDS WHEN DIFFERENCE BETWEEN OUTSIDE AIR TEMPERATURE AND ROOM TEMPERATURE IS LESS THAN CERTAIN VALUE) |
| B: | WHEN ASSUMED AEROSOL AMOUNT IS HIGHER THAN CERTAIN AMOUNT OR MORE (THEN ENDS WHEN VENTILATION PROCESS IS COMPLETED) |
| C: | WHEN AIR QUALITY AT CURRENT LOCATION SATISFIES CERTAIN CONDITION WHEN (PM2.5, POLLEN SCATTERING, INSIDE TUNNEL, ETC.) IS SATISFIED (THEN ENDS WHEN AIR QUALITY AT CURRENT LOCATION NO LONGER SATISFIES CERTAIN CONDITION) |
| RAINFALL D1 | RAIN SENSOR SIGNAL OR WEATHER INFORMATION NEAR CURRENT LOCATION AT CURRENT TIME POINT |
| AIR CONDITIONING D2 | SIGNAL FROM AIR CONDITIONER ECU |

IN-VEHICLE VENTILATION SYSTEM

CROSS-REFERENCE TO RELATED APPLICATION

The present application claims priority to Japanese Patent Application No. 2021-134242 filed on Aug. 19, 2021, the entire content of which is incorporated herein by reference.

TECHNICAL FIELD

The presently disclosed subject matter relates to an in-vehicle ventilation system.

BACKGROUND

In a case of using a vehicle, it often happens that a vehicle compartment is in a hot environment, for example, in a hot season or region. In addition, normally, an air conditioner mounted in the vehicle starts to work when an engine starts, and the vehicle compartment is automatically cooled until the temperature drops to an appropriate temperature. In order to lower the temperature in the vehicle compartment more efficiently, in some cases, an occupant manually or by operating a button lowers a window glass of the vehicle to create an opening for ventilation, and a manual operation is performed to take in outside air and ventilate.

For example, an in-vehicle temperature control system according to the related technique is disclosed to efficiently and promptly lower an in-vehicle temperature and to prevent crime. That is, the in-vehicle temperature control system includes an opening and closing body drive device that opens and closes a window glass, an air conditioning device that adjusts an in-vehicle temperature according to a set temperature, and a remote controller that can output a control signal for cooling the air conditioning device from outside the vehicle. In addition, a vehicle ECU performs, based on the input of the control signal, a crime prevention outside air introduction process of driving the opening and closing body drive device such that the window glass alternates between an opening operation and a closing operation, when the in-vehicle temperature is at least higher than an outside air temperature (see, for example, JP 2018-131053A).

On the other hand, recently, the importance of ventilation indoors is increasing in order to prevent the spread of COVID-19 infection. Therefore, in the case of using a vehicle, it is also desirable to ventilate the vehicle compartment on a regular basis, for example.

However, in the above related technique, since the window is opened/closed only considering the temperature and the crime prevention function, the occupant must open/close the window with a manual operation in order to provide ventilation to maintain the air environment in the vehicle compartment clean.

In addition, it cannot always be said that the air environment in the vehicle compartment is actually cleaned by opening the window of the vehicle to ventilate. For example, when the air outside the vehicle is polluted by pollen scattering, yellow sand, exhaust gas from other vehicles, dust discharged from the surrounding environment, etc., there is a high possibility that ventilation for the vehicle results in additional air pollution in the vehicle compartment.

In particular, for example, when the vehicle is traveling on a congested road or in a tunnel, there is a high possibility that the outside air is polluted, so it is considered better not to ventilate the vehicle. In addition, for example, when the window is opened if it is raining, there is a high possibility that rainwater enters the vehicle compartment.

Therefore, the ventilation to maintain the vehicle compartment clean has to be manually operated at the discretion of the occupant in the vehicle. However, it is usually difficult to visually confirm pollution of the outside air caused by fine particles such as PMS 0.5, so that it is impossible for a human to properly determine whether ventilation should be performed.

In addition, the air conditioner mounted in the vehicle is usually equipped with an outside air introduction duct. Further, the duct is provided with a valve for switching the presence/absence of outside air introduction. Therefore, it is possible to ventilate the vehicle compartment even when the window glass is closed. When the air outside the vehicle is polluted, there is a high possibility that the polluted air enters the vehicle compartment through the duct even when the window glass is closed.

SUMMARY

Illustrative aspects of the presently disclosed subject matter provide an in-vehicle ventilation system that facilitates automation of a ventilation operation to maintain a clean air environment in a vehicle compartment.

According to an illustrative aspect of the presently disclosed subject matter, an in-vehicle ventilation system includes a host ECU configured to acquire vehicle outside information using wireless communication, an air conditioner ECU configured to control an air conditioner installed in a vehicle compartment, a zone ECU configured to control a device in the vehicle compartment and to communicate with the host ECU and the air conditioner ECU and a power window unit configured to open and close a window of a vehicle. The zone ECU or the host ECU is configured to perform, based on information acquired inside the vehicle compartment and the vehicle outside information to be acquired by the host ECU, interlocked ventilation control interlockingly controls the power window unit and the air conditioner ECU.

According to the in-vehicle ventilation system of the presently disclosed subject matter, automation of a ventilation operation to maintain a clean air environment in a vehicle compartment is facilitated. That is, since a host ECU can make use of wireless communication, it is possible to acquire various pieces of information on external/outside environments via the Internet, for example. In addition, a zone ECU or the host ECU can appropriately determine, based on information on the vehicle compartment and the information on outside environments acquired by the host ECU, whether ventilation should be performed. Further, since interlocked ventilation control that combines control over a power window unit and control over an air conditioner ECU is performed, appropriate ventilation control according to the situation is easy.

Other aspects and advantages of the presently disclosed subject matter will be apparent from the following description, the drawings and the claims.

DESCRIPTION OF EMBODIMENTS

A specific embodiment related to the presently disclosed subject matter will be described below with reference to the drawings.

Figure 1:
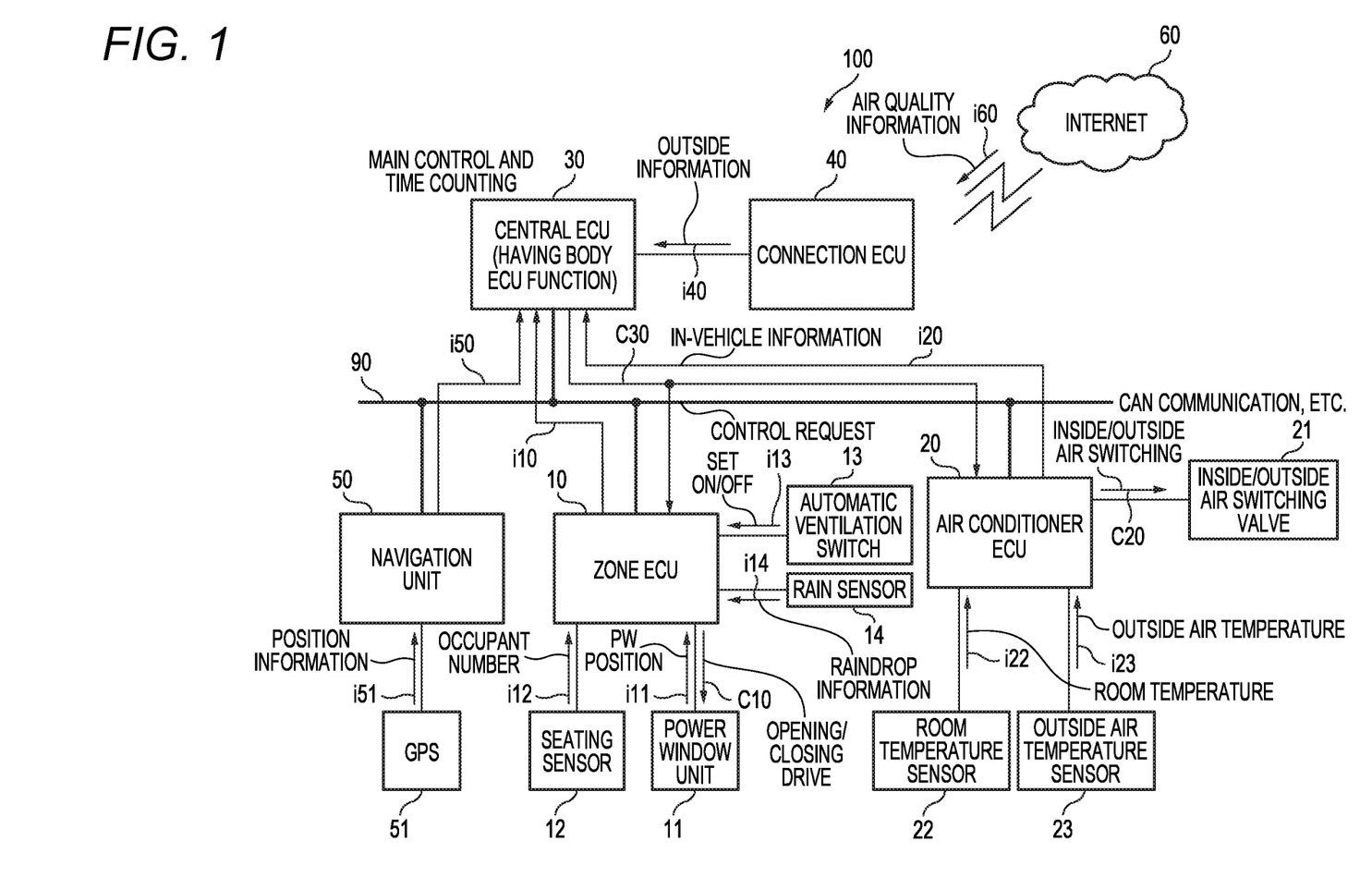
FIG. 1 is a block diagram showing a configuration of an in-vehicle ventilation system according to an embodiment of the presently disclosed subject matter.

FIG. 1 is a block diagram showing a configuration of an in-vehicle ventilation system 100 according to an embodiment of the presently disclosed subject matter.

The in-vehicle ventilation system 100 shown in FIG. 1 is to be mounted on a vehicle, and includes a zone ECU 10, an air conditioner ECU 20, a central ECU 30, a connection ECU 40, and a navigation unit 50 as main control units.

The zone ECU 10, the air conditioner ECU 20, the central ECU 30, and the navigation unit 50 are connected to each other via an in-vehicle communication bus 90 so as to be able to communicate with each other. The in-vehicle communication bus 90 provides a transmission line for wired communication corresponding to a vehicle communication standard such as a controller area network (CAN).

The zone ECU 10 shown in FIG. 1 has a function of managing opening/closing of a window glass of each vehicle door for ventilation in a vehicle compartment. Actually, a computer built in the zone ECU 10 executes a predetermined program to execute a process according to a situation.

A power window mechanism (power window unit) 11, a seating sensor 12, an automatic ventilation switch 13, and a rain sensor 14 mounted on respective parts of the vehicle are connected to the zone ECU 10.

The power window mechanism 11 can raise and lower the window glass of each door by a drive force of an electric motor provided for each door of the vehicle to form an opening for ventilation or close the opening.

In addition, the power window mechanism 11 includes a built-in position sensor (not shown) that outputs window position (PW position) information i11 corresponding to an opening degree of each window glass. When the zone ECU 10 outputs a predetermined opening/closing control signal C10, opening/closing drive for the power window mechanism 11 can be made.

The seating sensor 12 can detect whether the occupant is seated in the corresponding seat in the vehicle compartment. The seating sensor 12 according to the present embodiment outputs occupant number information i12 indicating the number of seated occupants based on the presence/absence of seating detected at positions of a plurality of seats.

The automatic ventilation switch 13 is a switch that can be turned ON and OFF by the occupant in this vehicle by operating a button or the like. A function for outputting switch information i13 for switching ON/OFF of automatic ventilation is assigned to the automatic ventilation switch 13.

The rain sensor 14 can detect, by an optical sensor, raindrops adhering to, for example, a specific region on an upper part of a front windshield (window glass) of the own vehicle and output raindrop information i14 indicating the detected state.

The zone ECU 10 can transmit in-vehicle information i10 including the window position information i11, the occupant number information i12, the switch information i13, and the raindrop information i14 to the central ECU 30 via the in-vehicle communication bus 90. In addition, the zone ECU 10 can control the power window mechanism 11 of each window according to a control request C30 transmitted from the central ECU 30.

The air conditioner ECU 20 includes a built-in computer having a function of controlling an air conditioning device (air conditioner) mounted on the vehicle. As shown in FIG. 1, an inside/outside air switching valve 21, a room temperature sensor 22, and an outside air temperature sensor 23 are connected to the air conditioner ECU 20.

The inside/outside air switching valve 21 is a switching valve capable of opening/closing a passage of a duct for introducing outside air into the vehicle compartment. The inside/outside air switching valve 21 can be opened/closed according to a switching control signal C20 output from the air conditioner ECU 20.

The room temperature sensor 22 is composed of a sensor such as a thermistor installed in the vehicle compartment, and can output room temperature information i22 indicating a detected temperature in the vehicle compartment. The outside air temperature sensor 23 is a temperature sensor installed at a part that can come into contact with the outside air, and can output outside air temperature information i23 indicating a detected temperature.

The air conditioner ECU 20 can transmit in-vehicle information i20 including the room temperature information i22 and the outside air temperature information i23 to the central ECU 30 via the in-vehicle communication bus 90. In addition, the air conditioner ECU 20 can perform control based on the switching control signal C20 to open/close the inside/outside air switching valve 21 according to the control request C30 transmitted from the central ECU 30.

The central ECU 30 is a control unit located hierarchically above the zone ECU 10, the air conditioner ECU 20, and the navigation unit 50 in terms of functions of the vehicle as a whole, and includes a built-in computer that performs main control and a time counting process for implementing functions of the in-vehicle ventilation system 100. Further, the central ECU 30 includes a function of a body ECU of this vehicle.

The central ECU 30 can acquire the in-vehicle information i10 and i20, and position information i50 from the ECUs via the in-vehicle communication bus 90. Further, outside information i40 can be acquired from the connection ECU 40. Based on these pieces of information, the central ECU 30 grasps the situation and generates the control request C30. This control request C30 is transmitted to the zone ECU 10 and the air conditioner ECU 20 via the in-vehicle communication bus 90. Accordingly, appropriate automatic ventilation control can be performed as described later.

The connection ECU 40 is mounted with a predetermined wireless communication module, and can always connect a wireless communication line between the vehicle and an Internet 60. Therefore, various pieces of information required on the vehicle can be acquired from the Internet 60.

In the present embodiment, the connection ECU 40 can acquire, from the Internet 60, air quality information i60 at a location near a current location of the own vehicle. The air quality information i60 is information corresponding to, for example, an air quality index (AQI) indicating a degree of air pollution, and can be acquired from a predetermined server on the Internet 60 as information provided by an administrative agency in charge of the environment. The air quality information i60 may be an actual observed value or a predicted value.

Similar to a typical car navigation device, the navigation unit 50 has a function of constantly grasping the current location of the own vehicle and guiding driving along a movement route to a destination based on predetermined road map information. A global positioning system (UPS) unit 51 is connected to the navigation unit 50 in order to calculate information on the current location of the own vehicle.

The GPS unit 51 can calculate a latitude/longitude representing the current location of the own vehicle based on times when radio waves are received from a plurality of GPS satellites. The navigation unit 50 can transmit the position information i50 to the central ECU 30 via the in-vehicle communication bus 90 based on position information i51 calculated by the UPS unit 51.

When an automatic ventilation function is turned ON by the automatic ventilation switch 13, the central ECU 30 according to the present embodiment automatically determines the necessity of ventilation according to the environment inside and outside the vehicle, and performs ventilation according to a degree of urgency.

Figure 2:
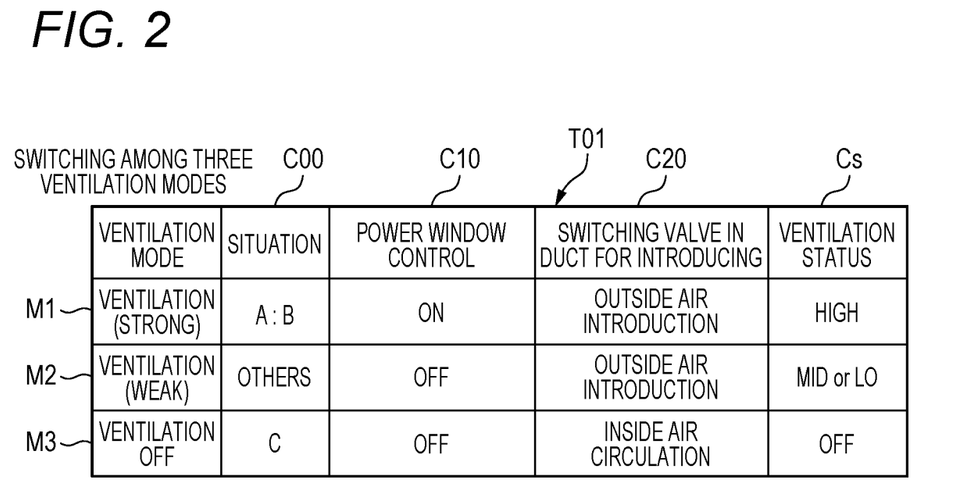
FIG. 2 is a schematic diagram showing a configuration example of a ventilation mode table.

FIG. 2 is a schematic diagram showing a configuration example of a ventilation mode table T01. In the present embodiment, the central ECU 30 has three ventilation modes M1, M2, and M3 as a pattern when performing automatic ventilation. A correspondence between these ventilation modes M1 to M3 and a difference in situation is registered in the ventilation mode table T01. The central ECU 30 can select appropriate ventilation modes M1 to M3 according to contents in the ventilation mode table T01.

The ventilation mode table T01 shown in FIG. 2 shows a correspondence between each of the ventilation modes M1 to M3 and a ventilation situation C00, the opening/closing control signal C10, the switching control signal C20, and a ventilation status Cs. Details of "A", "B", "C", and "others" of the ventilation situation C00 in the ventilation mode table T01 will be described later.

In the in-vehicle ventilation system 100, by turning ON/OFF the opening/closing control signal CM, the power window mechanism 11 can be driven to position the window glass as "open" or "closed". That is, setting the opening/closing control signal C10 to the "ON" state means a state where an opening is formed at the window glass and ventilation can be performed using this opening. In addition, setting the opening/closing control signal C10 to the "OFF" state means a state where ventilation cannot be performed at the window glass.

Since an open/closed state of the inside/outside air switching valve 21 is switched by switching the switching control signal C20 ON and OFF, it is possible to switch between a state of introducing the outside air and a state of circulating the inside air at a location of the outside air introduction duct of the air conditioner.

The ventilation status Cs in the ventilation mode table T01 includes four types, "HIGH", "MD", "LO", and "OFF". As shown in FIG. 2, when the ventilation situation C00 is "A" or "B", the ventilation mode M1 is selected. In this ventilation mode M1, relatively strong ventilation can be performed. Further, in the ventilation mode M1, the opening/closing control signal C10 is "ON", the switching control signal C20 is "outside air introduction", and the ventilation status Cs is "HIGH".

When the ventilation situation C00 is other than "A, B, C" in the ventilation mode table T01, the ventilation mode M2 is selected. In this ventilation mode M2, relatively weak ventilation can be performed. Further, in the ventilation mode M2, the opening/closing control signal C10 is "OFF", the switching control signal C20 is "outside air introduction", and the ventilation status Cs is "MID or LO".

When the ventilation situation C00 is "C", the ventilation mode M3 is selected. In this ventilation mode M3, Ventilation is turned OFF. Further, in the ventilation mode M3, the opening/closing control signal C10 is "OFF", the switching control signal C20 is "inside air circulation", and the ventilation status Cs is "OFF".

Figure 3:
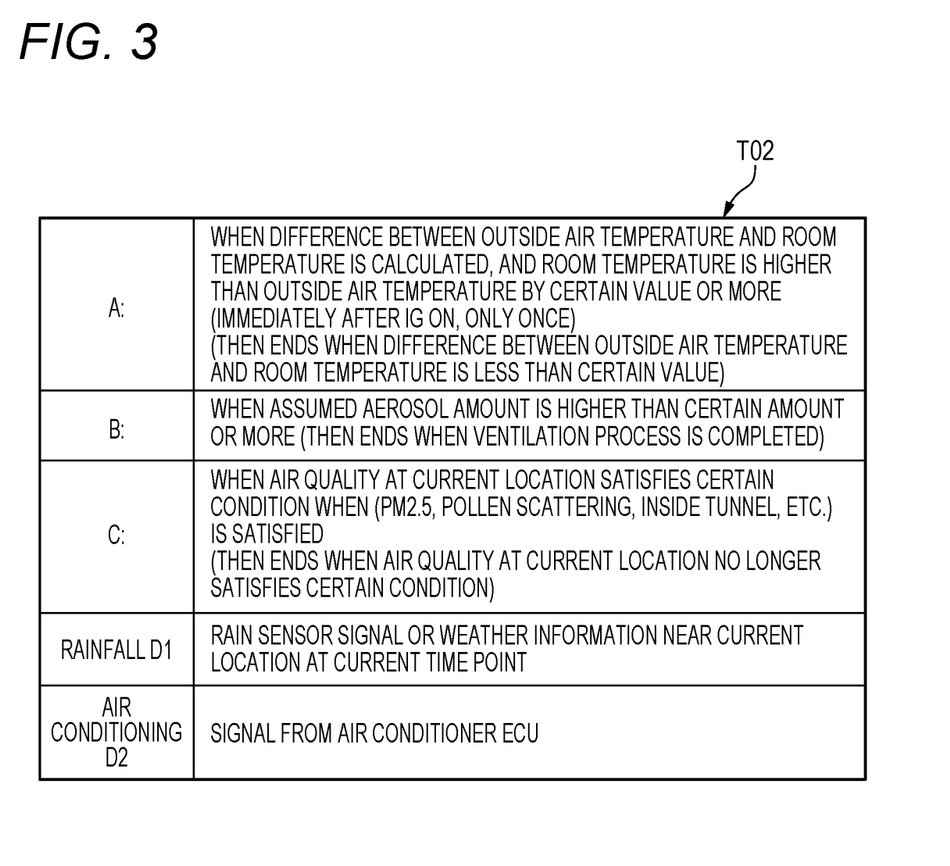
FIG. 3 is a schematic diagram showing a configuration example of a situation determination table.

FIG. 3 is a schematic diagram showing a configuration example of a situation determination table T02. In the present embodiment, when the central ECU 30 performs automatic ventilation, the situation is determined according to contents in the situation determination table T02, and the ventilation mode is selected according to the ventilation mode table T01.

When the situation determination table T02 shown in FIG. 3 is used, five types of situations "A", "B", "C", "D1", and "D2" can be determined as the ventilation situation C00. A condition corresponding to "A" in the situation determination table T02 is a case where the room temperature acquired by measurement is higher than the outside air temperature by a certain amount or more. However, it is only once immediately after ignition (IG) is turned ON. In addition, when a difference between the outside air temperature and the room temperature is less than a certain value, the situation "A" is no longer applicable.

A condition corresponding to "B" in the situation determination table T02 is a case where an assumed aerosol amount in the vehicle is higher than a certain amount or more. Here, the assumed aerosol amount is calculated according to, for example, the following equation based on the number of occupants and a length of a "continuous closed time".

$$Vaz = Nh \times Tx \tag{1}$$

Vaz: aerosol amount
Nh: number of occupants
Tx: length of time of continuous closed time The term "continuous closed time" means a duration of time over which a state is maintained where the power windows of all the windows are fully closed and the air conditioner is in an inside air circulation state. Further, when a predetermined ventilation process is completed, the situation "B" is no longer applicable.

A condition corresponding to "C" in the situation determination table T02 is a time when the air quality of the outside air at the current location satisfies a certain condition. Specific air quality conditions correspond to situations where information such as a PM2.5 concentration, pollen scattering, and tunnel interior meets clean conditions. Further, when the air quality at the current location does not meet certain conditions, the situation "C" is no longer applicable.

A situation corresponding to "D1" in the situation determination table T02 corresponds to a rainfall state. Superficially, "D1" corresponds to the case where it is estimated that the current state is a rainfall state based on the raindrop information i14 output by the rain sensor 14, or a case where it is estimated that the current state is a rainfall state based on actual condition information at a current location included in weather information that can be acquired from the Internet 60 or weather forecast information at a current time point. A situation corresponding to "D2" in the situation determination table T02 corresponds to a situation where the air conditioner managed by the air conditioner ECU 20 is operating and an air conditioning function such as cooling/heating is working.

Key information used by in-vehicle ventilation system for control are as follows:
(1) Ignition ON/OFF information;
(2) Occupant number information: can be grasped based on information output by the seating sensor 12 or an image from a camera that captures the vehicle compartment;
(3) Open/closed state of the power window mechanism 11: information that can be grasped whether the window glass is fully closed;
(4) Current location of the own vehicle: the position information i51 output by the GPS unit 51 can be used;
(5) Road information at the current location: information such as a map showing the presence/absence of a tunnel;
(6) Air quality information at the current location: information such as pollen information, PM2.5 concentration; and dust pollution that can be acquired from the Internet. Alternatively, a sensor for measuring the air quality of the outside air may be mounted on the own vehicle;
(7) Outside air temperature: can be acquired from the air conditioner ECU 20;
(8) In-vehicle temperature: can be acquired from the air conditioner ECU 20; and
(9) Raindrop information: the raindrop information i14 output by the rain sensor 14 or weather information that can be acquired from the Internet based on the current location can be used.

Figure 4:
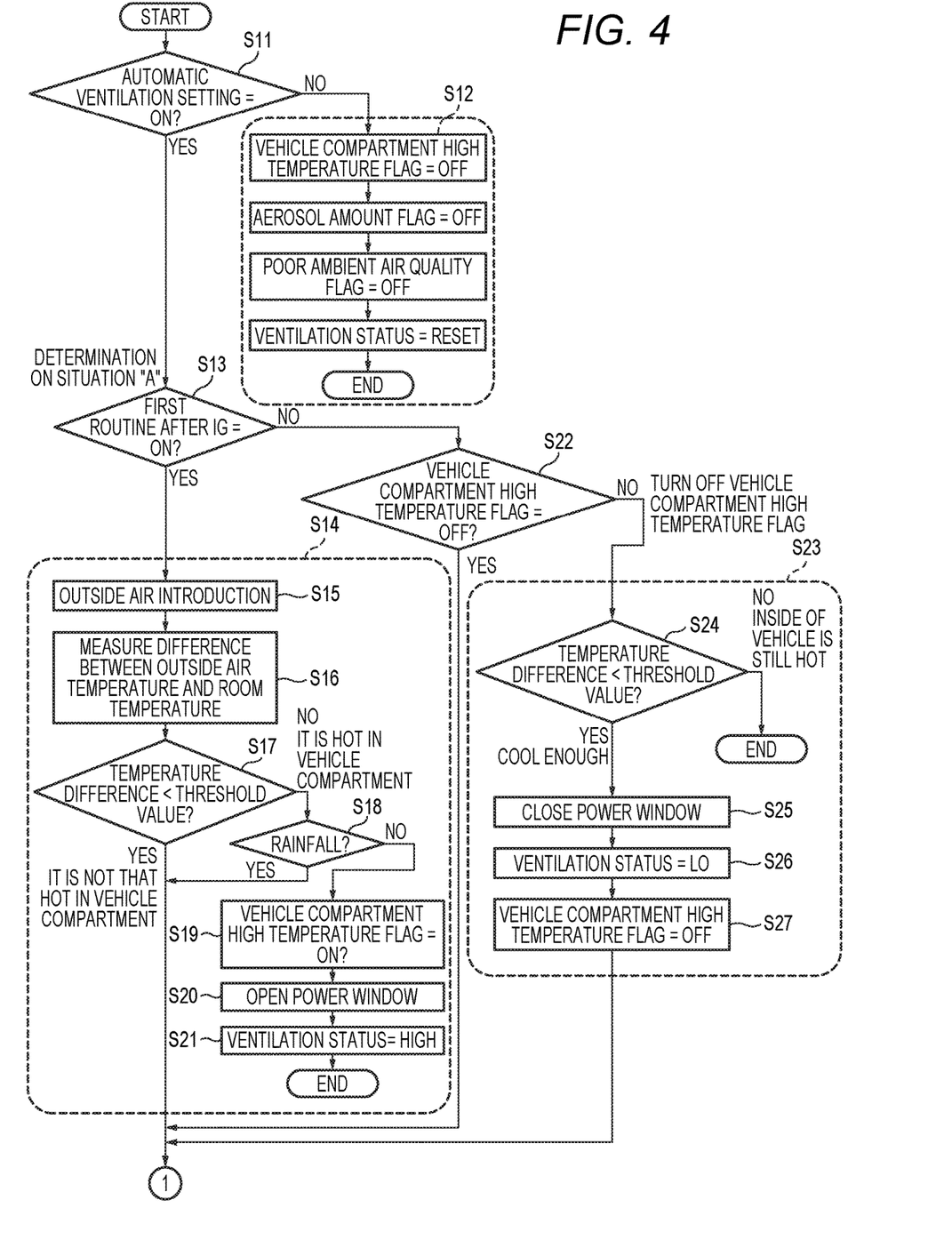
FIG. 4 is a flowchart showing a main operation-1 of the in-vehicle ventilation system.
Figure 5:
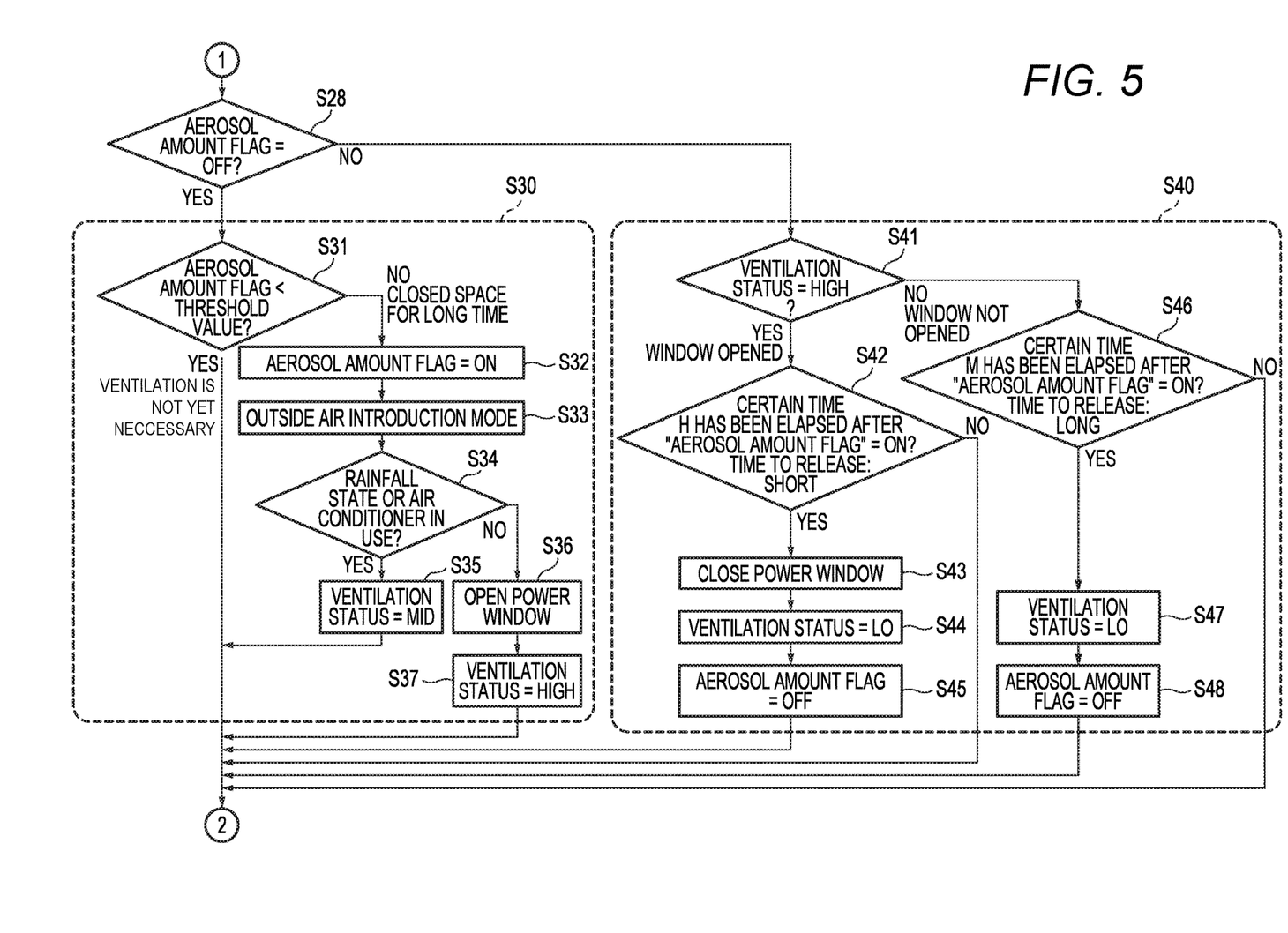
FIG. 5 is a flowchart showing a main operation-2 of the in-vehicle ventilation system.
Figure 6:
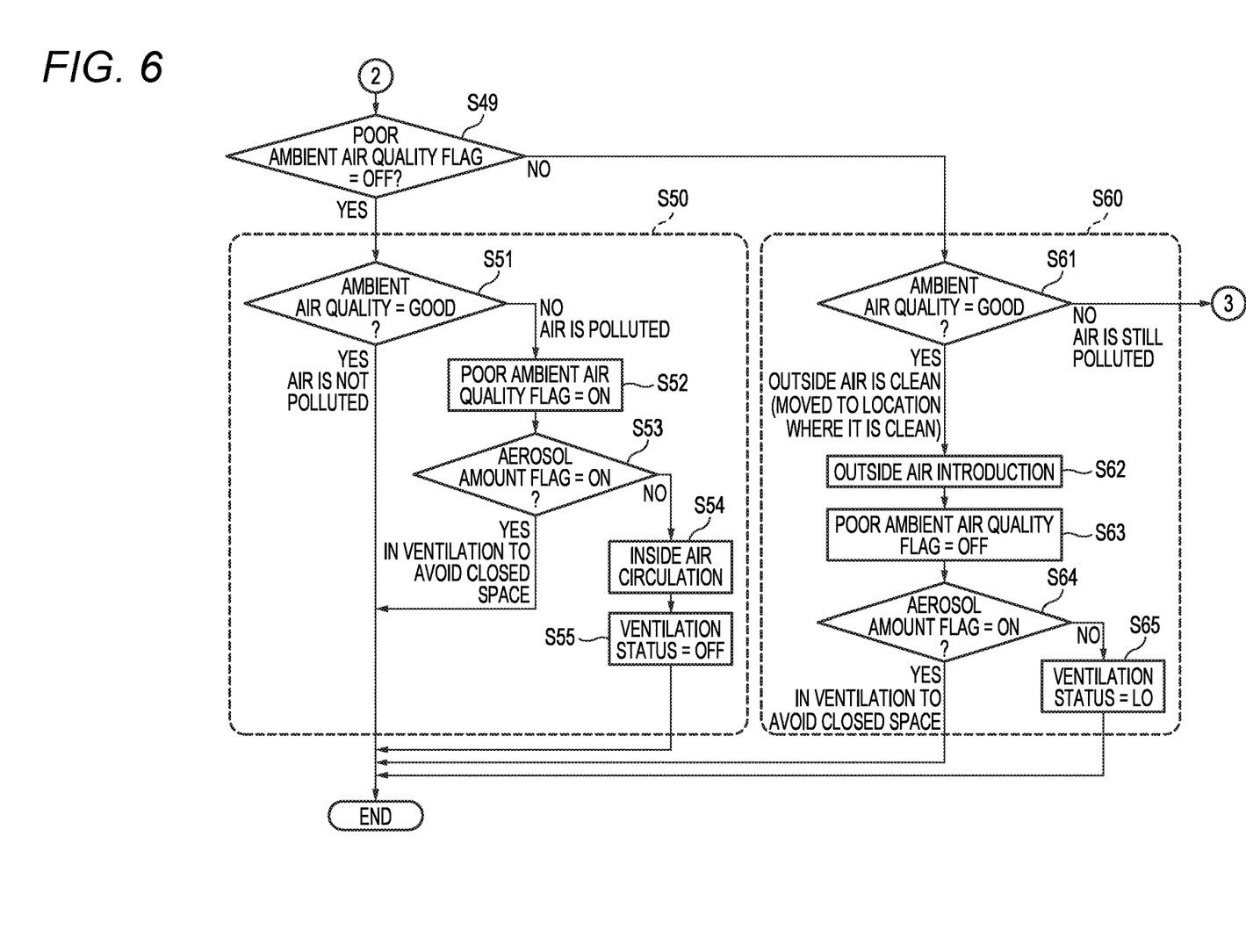
FIG. 6 is a flowchart showing a main operation-3 of the in-vehicle ventilation system.
Figure 7:
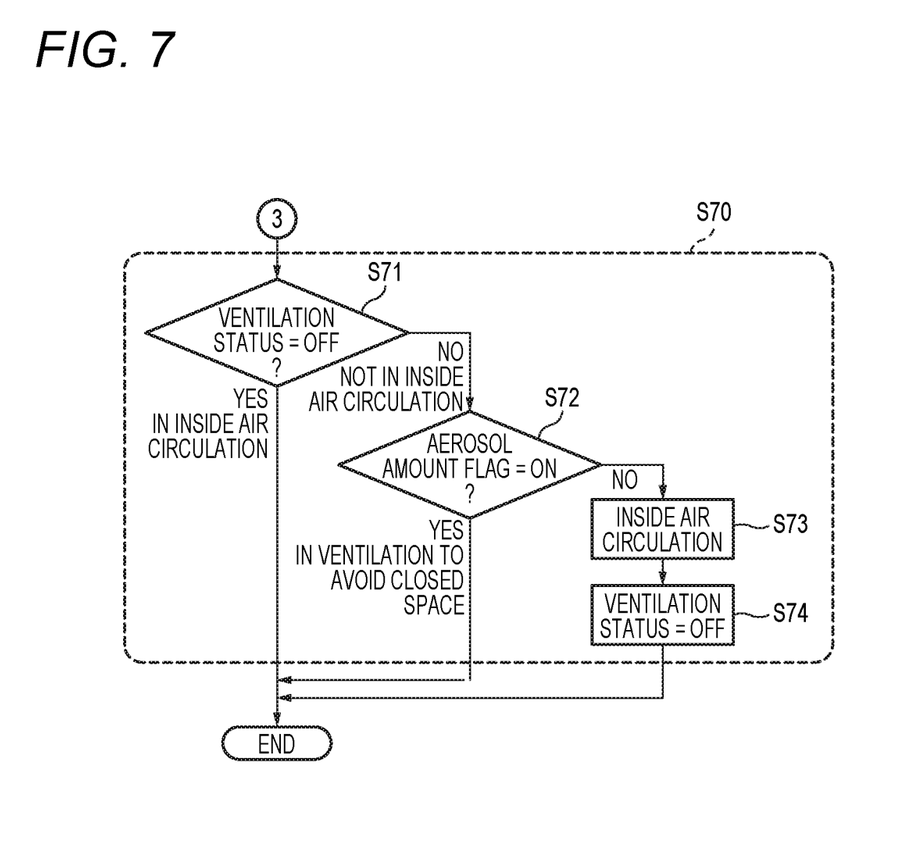
FIG. 7 is a flowchart showing a main operation-4 of the in-vehicle ventilation system.

FIG. 4 is a flowchart showing a main operation-1 of the in-vehicle ventilation system 100. FIG. 5 is a flowchart showing a main operation-2 of the in-vehicle ventilation system 100. FIG. 6 is a flowchart showing a main operation-3 of the in-vehicle ventilation system 100. FIG. 7 is a flowchart showing a main operation-4 of the in-vehicle ventilation system 100.

In the present embodiment, the central ECU 30 plays a central role in performing this control. Of course, the zone ECU 10 may be used for control instead of the central ECU 30. The operations in FIG. 4 to FIG. 7 will be described below.

The operations in FIG. 4 to FIG. 7 are repeatedly performed by the central ECU 30, for example, at a regular interval. The central ECU 30 grasps a state of the switch information i13 corresponding to an operation of the automatic ventilation switch 13 in S11 of FIG. 4, and identifies ON/OFF of automatic ventilation setting.

When the automatic ventilation setting is OFF, the central ECU 30 initializes, in S12, various flags to be used in the automatic ventilation control. That is, the ventilation status Cs is reset by turning OFF a "vehicle compartment high temperature flag", an "aerosol amount flag", and a "poor ambient air quality flag".

When the automatic ventilation setting is ON, first, the central ECU 30 performs processes after S13 in order to determine the situation "A" in the situation determination table T02.

In S13, the central ECU 30 identifies whether a routine is executed for the first time after the ignition is switched on, and when it is the first time, executes S14 next. When it is not the first time, the central ECU 30 confirms the "vehicle compartment high temperature flag" in S22, and when the "vehicle compartment high temperature flag" is not OFF, the central ECU 30 executes the process of S23.

A process of S14 is a process to automatically open the window when it is hot immediately after a user of the vehicle gets on the vehicle, and the window cannot be opened when it is raining. The central ECU 30 controls the inside/outside air switching valve 21 in S15 to switch to "outside air introduction", and measures the temperature difference between the outside air temperature and the room temperature in S16. Then, in S17, whether "temperature difference<threshold value" is determined, and in S18, it is confirmed whether it is in a rainfall state.

When the inside of the vehicle is not hot and it is not in a rainfall state, the process proceeds to S19 after S17 and S18. Then, the central ECU 30 switches the "vehicle compartment high temperature flag" to ON (S19), gives, to the zone ECU 10, an instruction to fully open the power window mechanism 11 (S20), and switches the ventilation status Cs to "HIGH" (S21).

On the other hand, when the user of the vehicle opens the window immediately after boarding because it is hot, other monitoring is not performed until the in-vehicle temperature drops, and the central ECU 30 controls in S23 to give priority to opening the window for lowering the in-vehicle temperature.

That is, by determining whether "temperature difference<threshold value" in S24, it is possible to distinguish between a state where the inside of the vehicle is still hot and a state where the inside of the vehicle is cool enough. Then, when the inside of the vehicle is cool enough, the central ECU 30 gives to the zone ECU 10 an instruction to fully close the power window mechanism 11 in S25, switches the ventilation status Cs to "LO" in S26, and switches the "vehicle compartment high temperature flag" to OFF in S27.

In addition, the central ECU 30 performs processes after S28 in FIG. 5 in order to determine the situation "B" in the situation determination table T02. Then, the central ECU 30 executes a process of S30 when the "aerosol amount flag" is OFF, and executes a process of S40 when the "aerosol amount flag" is ON.

The central ECU 30 determines whether "aerosol amount<threshold value" in S31, Then, since the aerosol amount increases when the inside of the vehicle is in a closed state for a long time, the process proceeds from S31 to S32 for ventilation. In this case, the central ECU 30 switches the "aerosol amount flag" ON (S32) and gives an instruction to the air conditioner ECU 20 to switch the inside/outside air switching valve 21 to an outside air introduction mode (S33).

Further, in order to determine whether the window should be opened, the central ECU 30 identifies in S34 whether it is raining (rainfall state) and whether the air conditioner is in use. Then, when it is in a rainfall state or the air conditioner is in use, the central ECU 30 switches the ventilation status Cs to "MID" in S35.

When it is not in a rainfall state or the air conditioner is not in use, the central ECU 30 gives an instruction to the zone ECU 10 to fully open the power window mechanism 11 (S36), and switches the ventilation status Cs to "HIGH" (S37).

The process of S40 shown in FIG. 5 is a process for turning OFF the "aerosol amount flag". The central ECU 30 identifies in S41 whether the ventilation status Cs is "HIGH", proceeds to S42 when the ventilation status Cs is "HIGH", and proceeds to S46 otherwise.

In S42, the central ECU 30 identifies whether the elapsed time since the "aerosol amount flag" is turned ON has elapsed a certain time (H: the time to release is short), and when the certain time elapses, the process proceeds to S43 next. Then, an instruction to fully close the power window mechanism 11 is given to the zone ECU 10 (S43), the ventilation status Cs is switched to "LO" (S44), and the "aerosol amount flag" is turned OFF (S45).

On the other hand, in S46, the central ECU 30 identifies whether the elapsed time since the "aerosol amount flag" is turned ON has elapsed a certain time (M: the time to release is long), and when the certain time elapses, the process proceeds to S47 next.

Here, the length of time of the turning ON to the turning OFF of the "aerosol amount flag", that is, the length of time for ventilation (H/M), is switched between a case were the window is opened (S42) and a case where the window is not opened (S46) to further optimize the control. The central ECU 30 switches the ventilation status Cs to "LO" in S47, and turns OFF the "aerosol amount flag" in S48.

Further, the central ECU 30 performs processes after S49 in FIG. 6 in order to determine the situation "C" in the situation determination table T02. Then, when the "poor ambient air quality flag" is OFF, the process of S50 is executed, and when the "poor ambient air quality flag" is ON, the process of S60 is executed.

In S51, the central ECU 30 identifies whether the air quality of the outside air around the own vehicle is good. Then, when the air quality of the outside air is not good, the process proceeds from S51 to S52, and the "poor ambient air quality flag" is switched ON.

Further, the central ECU 30 confirms the "aerosol amount flag" in S53 next, and proceeds to S54 when the "aerosol amount flag" is not turned ON. Then, an instruction is given to the air conditioner ECU 20 to switch the inside/outside air switching valve 21 to inside air circulation (S54). Further, the ventilation status Cs is switched OFF (S55).

That is, in the process of S50, when the air quality around the own vehicle is poor, the air conditioner is switched to inside air circulation. However, when ventilation is performed to avoid having a closed space for a long time, the state of introducing the outside air is maintained without switching to inside air circulation.

On the other hand, when the "poor ambient air quality flag" is ON, the central ECU 30 identifies in S61 whether the air quality of the outside air around the own vehicle is good. Then, when the air quality of the outside air changes from a poor state to a good state, the process proceeds from S61 to S62, and the central ECU 30 gives an instruction to the air conditioner ECU 20 to switch to outside air introduction. Further, the "poor ambient air quality flag" is switched OFF (S63).

Further, the central ECU 30 confirms the "aerosol amount flag" in S64 next, and proceeds to S65 when the "aerosol amount flag" is not turned ON. Then, the ventilation status Cs is switched to "U)".

On the other hand, when the air quality of the outside air does not change in a poor state, the central ECU 30 executes the process of S70 in FIG. 7. The central ECU 30 confirms the state of the ventilation status Cs in S71. Then, when the ventilation status Cs is OFF, that is, when the inside air circulation is performed, the state is maintained as it is. When the ventilation status Cs is not OFF, the central ECU 30 confirms the "aerosol amount flag" in S72 next. When the "aerosol amount flag" is ON, that is, when ventilation is performed to avoid having a closed space for a long time, the state is maintained as it is.

When the "aerosol amount flag" is not ON, the central ECU 30 gives an instruction to the air conditioner ECU 20 to switch to inside air circulation (S73). Further, the ventilation status Cs is switched OFF (S74). That is, when the ambient air quality deteriorates during the ventilation for the purpose of avoiding closing the space for a long time and then the ventilation for that purpose is completed, the air conditioner is switched to inside air circulation in S73.

The opening degree of the opening when the power window mechanism 11 is automatically controlled and the window glass is opened for ventilation can be appropriately determined as necessary. For example, any one of an opening state such as fully open, ⅓ of fully open, ½ of fully open, and an opening length of 10 cm can be appropriately selected.

As described above, according to the in-vehicle ventilation system 100 of the present embodiment, when the automatic ventilation setting is turned ON by the automatic ventilation switch 13, the central ECU 30 automatically switches the ventilation modes M1 to M3 (see FIG. 2) to perform appropriate ventilation, so that a manual operation for ventilation is no longer necessary. Therefore, it is possible to prevent the aerosol amount in the vehicle compartment from increasing due to, for example, the occupant forgetting to operate the ventilation for the vehicle.

In addition, when the opening/closing of the window is interlocked with the outside air introduction and the inside air circulation using the air conditioner, or the strength of ventilation is appropriately adjusted by interlocking the presence/absence of the air conditioner operation with the opening/closing of the window, it is possible to switch to an appropriate ventilation state according to the environment inside and outside the vehicle. Further, it is easy to automatically ventilate the inside of the vehicle that has become hot while parking such that the inside of the vehicle can be quickly cooled to a comfortable temperature in a short time immediately after boarding.

It is possible to appropriately switch the ventilation mode according to situations such as the air quality or the weather of the environment outside the vehicle. Therefore, it is easy to prevent, for example, outside air polluted by yellow sand or other environmental pollutants, air polluted by the exhaust gas of other vehicles in tunnels, and rainwater from entering the vehicle compartment.

In addition, when the aerosol amount in the vehicle is estimated based on the number of occupants and the length of time that the vehicle is closed, and is reflected in the automatic ventilation control, it is easy to reduce the risk of spreading COVID-19 infection, for example.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

For example, in addition to the control shown in the above embodiment, the central ECU 30 can grasp the change of the situation based on various pieces of information that can be acquired, and it is assumed that the result is reflected in the control over the power window mechanism 11. For example, in a situation where an emergency vehicle is approaching from behind the own vehicle, it is conceivable to perform automatic control so as to open the window to make it easier to hear the siren sound According to an aspect of the embodiments described above, an in-vehicle ventilation system includes a host ECU (for example, central ECU 30, connection ECU 40) configured to acquire vehicle outside information using wireless communication, an air conditioner ECU (20) configured to control an air conditioner installed in a vehicle compartment, a zone ECU (10) configured to control a device in the vehicle compartment and to communicate with the host ECU and the air conditioner ECU and a power window unit (11) configured to open and close a window of a vehicle. The zone ECU or the host ECU is configured to perform, based on information acquired inside the vehicle compartment (for example, in-vehicle information i10, i20) and the vehicle outside information (for example, outside information i40) to be acquired by the host ECU, interlocked ventilation control interlockingly controls the power window unit and the air conditioner ECU.

According to the in-vehicle ventilation system having the above configuration, the zone ECU or the host ECU performs appropriate ventilation based on the information acquired in the vehicle compartment and the vehicle outside information, so that a manual operation for ventilation is no longer necessary. Therefore, it is possible to prevent the aerosol amount in the vehicle compartment from increasing due to, for example, the occupant forgetting to operate the ventilation for the vehicle.

The zone ECU or the host ECU may be configured to switch among three types of ventilation modes (M1 to M3), each defined by a state of an outside air introduction switching valve (for example, inside/outside air switching valve 21) in the air conditioner and an opening/closing state of the window of the power window unit.

With this configuration, when the zone ECU or the host ECU interlocks the opening/closing of the window with the outside air introduction and the inside air circulation using the air conditioner, or appropriately adjusts the strength of ventilation by interlocking the presence/absence of the air conditioner operation with the opening/closing of the window, it is possible to switch to an appropriate ventilation state according to the environment inside and outside the vehicle.

The zone ECU or the host ECU may be configured to estimate an aerosol amount in the vehicle and to reflect the estimated aerosol amount to the ventilation mode switching control (S31).

With this configuration, when the zone ECU or the host ECU estimates the aerosol amount in the vehicle, and reflects the estimated aerosol amount in the automatic ventilation control, it is possible to reduce the risk of spreading COVID-19 infection, for example.

The zone ECU or the host ECU may be configured to acquire information on a current location (for example, position information i50) at which the vehicle is located, to acquire information (for example, air quality information i60) indicative of an air quality of outside air corresponding to the current location, and to reflect the aerosol amount in the vehicle and the air quality of the outside air to the ventilation mode switching control.

With this configuration, the zone ECU or the host ECU can appropriately switch the ventilation mode according to situations such as the air quality or the weather of the environment outside the vehicle corresponding to the current location of the own vehicle. Therefore, it is easy to prevent, for example, outside air polluted by yellow sand or other environmental pollutants, air polluted by the exhaust gas of other vehicles in tunnels, and rainwater from entering the vehicle compartment.

The zone ECU or the host ECU may be configured to manage an information indicative of the number of occupants in the vehicle compartment and a length of time over which the vehicle compartment has been closed, and to estimate the aerosol amount (Vaz) in the vehicle based on the information.

With this configuration, when the zone ECU or the host ECU estimates the aerosol amount in the vehicle based on the number of occupants and the length of time that the vehicle is closed, and reflects the estimated aerosol amount in the automatic ventilation control, it is possible to reduce the risk of spreading COVID-19 infection, for example.

What is claimed is:

1. An in-vehicle ventilation system comprising:
a host electronic control unit (ECU) configured to acquire vehicle outside information using wireless communication;
an air conditioner ECU configured to control an air conditioner installed in a vehicle compartment;
a zone ECU configured to control a device in the vehicle compartment and to communicate with the host ECU and the air conditioner ECU; and
a power window unit configured to open and close a window of a vehicle,
wherein the zone ECU or the host ECU is configured to perform a ventilation operation, based on information acquired inside the vehicle compartment and the vehicle outside information acquired by the host ECU, to facilitate at least a threshold level of cleanliness of air within the vehicle compartment,
wherein the ventilation operation corresponds to an interlocked ventilation control which interlockingly controls the power window unit and the air conditioner ECU, and
wherein, by performing the ventilation operation, the zone ECU or the host ECU is configured to:
estimate an aerosol amount in the vehicle,
among three types of ventilation modes corresponding to interlocked ventilation controls of an outside air introduction switching valve in the air conditioner and an opening/closing state of the window of the power window unit, select a ventilation mode corresponding to an interlocked ventilation control based on, as the information acquired inside the vehicle compartment, the estimated aerosol amount in the vehicle, and based on the vehicle outside information acquired by the host ECU,
based on the selected ventilation mode, give an instruction to switch the outside air introduction switching valve in the air conditioner to an outside air introduction mode and keep a first control state to close the window of the vehicle for a first period in a state in which the estimated aerosol amount is greater than a threshold value and a certain condition is satisfied,
based on the selected ventilation mode, give the instruction to switch the outside air introduction switching valve in the air conditioner to the outside air introduction mode and keep a second control state to open the window of the vehicle for a second period that is shorter than the first period in a state in which the estimated aerosol amount is greater than the threshold value and the certain condition is not satisfied, and
perform the interlocked ventilation control which interlockingly controls the power window unit and the air conditioner ECU based on the selected ventilation mode, wherein the zone ECU or the host ECU is configured to manage an information indicative of a number of occupants in the vehicle compartment and a length of time over which the vehicle compartment has been closed, wherein the zone ECU or the host ECU is configured to estimate the aerosol amount in the vehicle according to an equation (1) based on the information, wherein the equation (1) is $Vaz=Nh \times Tx$, wherein the Vaz is the aerosol amount, wherein the Nh is the number of occupants, and wherein the Tx is the length of time over which the vehicle compartment has been closed.

2. The in-vehicle ventilation system according to claim 1, wherein the zone ECU or the host ECU is configured to acquire, as the vehicle outside information, information on a current location at which the vehicle is located and information indicative of an air quality of outside air corresponding to the current location, and, as the information acquired inside the vehicle compartment, the aerosol amount in the vehicle, and perform the interlocked ventilation control based on the aerosol amount in the vehicle and the air quality of the outside air.

3. The in-vehicle ventilation system according to claim 1, wherein the certain condition is whether it is raining or whether the air conditioner is in use.

* * * * *